L. C. PRETTYMAN.
COMBINED HOSE COUPLING AND FAUCET.
APPLICATION FILED OCT. 3, 1911.
1,052,088.
Patented Feb. 4, 1913.
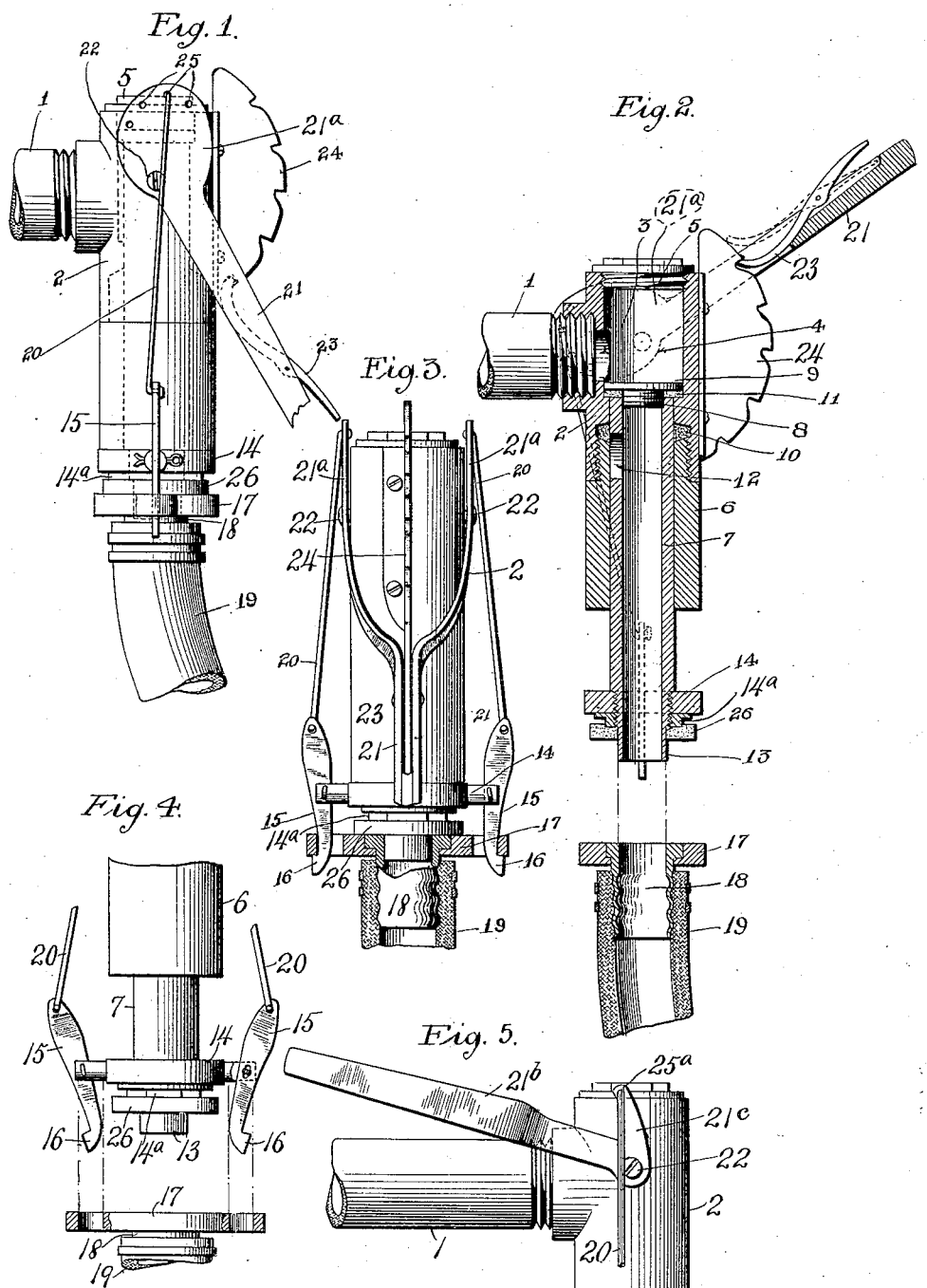

UNITED STATES PATENT OFFICE.

LEWIS C. PRETTYMAN, OF LOS ANGELES, CALIFORNIA.

COMBINED HOSE-COUPLING AND FAUCET.

1,052,088. Specification of Letters Patent. Patented Feb. 4, 1913.

Application filed October 3, 1911. Serial No. 652,638.

*To all whom it may concern:*

Be it known that I, LEWIS C. PRETTYMAN, a citizen of the United States, residing at Los Angeles, in the county of Los Angeles and State of California, have invented a new and useful Combined Hose-Coupling and Faucet, of which the following is a specification.

This invention relates to a combined hose coupling and faucet, and one of the objects of the invention is to enable the hose to be connected to the faucet by a quick movement of a lever.

A further object is to cause the faucet to be automatically opened when the hose is coupled, and to cause the faucet to be automatically closed when the hose is uncoupled, a single movement of the lever in one direction serving to couple the hose and open the faucet, while a single movement of the lever in the other direction serves to close the faucet and uncouple the hose.

The invention is of especial value for hydrants, enabling instant connection of hose and flow of water in case of fire.

The invention is also useful in gas lines or any conduit requiring the application of a hose, or pipe and valve.

Referring to the drawings: Figure 1 is a side elevation of the invention, showing the hose attached and the faucet open. Fig. 2 is a longitudinal sectional view through the invention showing the hose uncoupled and the faucet closed. Fig. 3 is a front elevation partly in section. Fig. 4 is a side elevation showing the coupling arms in unlocking position. Fig. 5 is a side view showing a modified form of lever.

1 designates the service pipe to which is screwed the faucet 2, the latter having a side port 3 which communicates with the pipe 1, and having a cylindrical chamber 4 the upper end of which is closed by a plug 5. Screwed in the lower portion of the faucet 2 is a thimble 6 which serves as a guide for a nozzle member 7, the latter being slidable therein and the upper end of the nozzle member 7 is closed by a plug 8 having a piston head 9 which perfectly fits the chamber 4. A gasket 10 is arranged to prevent leakage past the nozzle member 7, and a rubber washer 11 is provided between the nozzle member 7 and the head 9. The nozzle member 7 has a side port 12 which is adapted to communicate with the side port 3 when the nozzle member 7 is pushed up so that the piston 9 strikes the plug 5 at the top and when in such position water passes from the pipe 1 through the side ports 3 and 12 into the nozzle member 7, but when the nozzle member 7 is in its lower position as shown in Fig. 2 the side port 12 is out of communication with the side port 3 and the piston 9 prevents passage of water from chamber 4 into the nozzle member 7.

The lower end of the nozzle member 7 is formed with a stepped screw-threaded part having a reduced extremity 13 which is adapted to enter the end of the hose, as will be described, and a supporting member 14 secured by a binding collar $14^a$ is screwed to the lower end of the nozzle member 7 to which is pivoted a pair of coupling arms 15 which have hooked ends 16 adapted to engage a locking plate 17 which is secured to the thimble 18 which is arranged in the end of the hose 19. Wires 20 extend from the coupling arms 15 to the two arms $21^a$ of a lever 21 which is pivoted at 22 and has a pawl 23 which is movable over a notched sector 24. The lever arms $21^a$ have a series of holes 25 for connecting the wire 20 therewith at various points.

By operating the lever 21 into the position shown in Fig. 1, the coupling arms 15 having first been inserted in the coupling member 17, will cause the latter to be drawn firmly into position, forcing the flange 13 of the nozzle 7 into the thimble 18 of the hose, which together with washer 26 makes a tight connection so that water passes freely into the hose without leakage at this point, and as before explained, this movement of the lever causes the coupling arms 15 to draw upward on the coupling member 14 and the latter forces up the nozzle 7, bringing its port 12 into register with port 3 so that water flows through the instant the coupling is effected. The pawl 23 holds the lever 21 in the position stated.

To uncouple the parts the pawl 23 is released, which enables the lever 21 to be moved into the opposite direction to release coupling arms 15 by swinging them on their pivots and permitting the coupling members 17 to fall away, and at the same time moving down the nozzle 7 so that the piston 9 shuts off the flow of water through the nozzle.

Obviously the nozzle may be opened or closed by manipulating the lever 21 with or without attaching the hose.

In Fig. 5 I show another form of lever which may be substituted for the lever 21 and consists of long arms 21<sup>b</sup> having short arms 21<sup>c</sup> to which the wires 20 are connected.

What I claim is:

1. A combined hose coupling and faucet comprising a faucet member closed at its inner end and having a side port, a nozzle member closed at its inner end and having a side port, and means for sliding the nozzle member in the faucet member for placing the side ports in and out of register, consisting of a supporting member secured to the lower end of the nozzle member, arms pivoted to the supporting member, a lever having arms pivoted to the faucet member, and wires connecting the supporting member with the lever arms.

2. A combined hose coupling and faucet comprising a faucet member closed at its inner end and having a side port, a nozzle member closed at its inner end and having a side port, and means for sliding the nozzle member in the faucet member for placing the side ports in and out of register, consisting of a supporting member secured to the lower end of the nozzle member, arms pivoted to the supporting member, a lever having arms pivoted to the faucet member, and a pawl, a notched sector with which the pawl is adapted to engage, and wires connecting the supporting member with the lever arms.

3. A combined hose coupling and faucet comprising a faucet member closed at its inner end and having a side port, a nozzle member closed at its inner end and having a side port, and means for sliding the nozzle member in the faucet member for placing the side ports in and out of register, consisting of a supporting member secured to the lower end of the nozzle member, arms having hooked ends and pivoted to the supporting member, a lever having arms pivoted to the faucet member, wires connecting the supporting member with the lever arms and a separable hose member with which the hooks of the pivoted arms are adapted to engage.

In testimony whereof, I have hereunto set my hand at Los Angeles, California, this 26th day of September, 1911.

LEWIS C. PRETTYMAN.

In presence of—
  G. T. HACKLEY,
  GLADYS RUSSELL.

---

Copies of this patent may be obtained for five cents each, by addressing the " Commissioner of Patents, Washington, D. C."